United States Patent
Cho et al.

(10) Patent No.: US 8,049,737 B2
(45) Date of Patent: Nov. 1, 2011

(54) DUAL POINTING DEVICE AND METHOD BASED ON 3-D MOTION AND TOUCH SENSORS

(75) Inventors: Sung-Jung Cho, Suwon-si (KR); Eun-Seok Choi, Anyang-si (KR); Kyu-Yong Kim, Yongin-si (KR); Seong-Il Cho, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 735 days.

(21) Appl. No.: 12/213,201

(22) Filed: Jun. 16, 2008

(65) Prior Publication Data

US 2009/0153500 A1    Jun. 18, 2009

(30) Foreign Application Priority Data

Dec. 17, 2007 (KR) ........................ 10-2007-0132463

(51) Int. Cl.
*G06F 3/041* (2006.01)
(52) U.S. Cl. ........................................ 345/173; 345/158
(58) Field of Classification Search .......... 345/156–178; 178/18.01–18.09, 18.11, 19.01–19.06, 20.01
See application file for complete search history.

(56) References Cited

U.S. PATENT DOCUMENTS

| | | | | |
|---|---|---|---|---|
| 4,891,632 A * | 1/1990 | Chang | ............... | 345/165 |
| 6,489,948 B1 * | 12/2002 | Lau | ............... | 345/163 |
| 7,133,026 B2 * | 11/2006 | Horie et al. | ............... | 345/163 |
| 7,262,760 B2 * | 8/2007 | Liberty | ............... | 345/158 |
| 7,321,358 B2 * | 1/2008 | Faeth | ............... | 345/156 |
| 7,545,362 B2 * | 6/2009 | Kong | ............... | 345/158 |
| 7,737,944 B2 * | 6/2010 | Harrison et al. | ............... | 345/156 |
| 2005/0179650 A1 * | 8/2005 | Ludwig | ............... | 345/156 |
| 2005/0179651 A1 * | 8/2005 | Ludwig | ............... | 345/156 |
| 2006/0267934 A1 * | 11/2006 | Harley et al. | ............... | 345/157 |
| 2008/0288205 A1 * | 11/2008 | Teoh et al. | ............... | 702/150 |

FOREIGN PATENT DOCUMENTS

| | | |
|---|---|---|
| JP | 09-282086 | 10/1997 |
| JP | 2005-339222 | 12/2005 |
| KR | 10-2005-0030241 | 3/2005 |
| KR | 10-2006-0134119 | 12/2006 |

\* cited by examiner

*Primary Examiner* — Stephen Sherman
(74) *Attorney, Agent, or Firm* — Staas & Halsey LLP (57) ABSTRACT

A dual pointing device and method based on 3-D motion and touch sensors are provided. The dual pointing device includes a sensor including a first sensor sensing a motion in a space and a second sensor sensing a touch input, a movement-mode-determining unit determining a movement mode type using signals of the first and second sensors, and a pointer-moving unit moving a pointer on a display screen using at least one of the signals of the first sensor and the second sensor according to the determined movement mode type.

32 Claims, 11 Drawing Sheets

DUAL POINTING DEVICE AND METHOD BASED ON 3-D MOTION AND TOUCH SENSORS

CROSS-REFERENCE TO RELATED APPLICATION

This application claims priority from Korean Patent Application No. 10-2007-0132463 filed on Dec. 17, 2007, in the Korean Intellectual Property Office, the disclosure of which is incorporated herein by reference in its entirety.

BACKGROUND OF THE INVENTION

1. Field of the Invention

The present invention relates to a user interface, and, more particularly, to a dual pointing device and method using a user input interface based on three-dimensional (3-D) motion and touch sensors.

2. Description of the Related Art

In general, methods and devices of user input interfacing, motion-based input interfaces and touch-based input interfaces exist as independent interface devices.

In particular, a user input interface based on a user's hand motion in a space allows a user to move a pointing device using shoulder and arm muscles, which are suitable to human motion, i.e., producing a great force over an extended range of area, rather than to fine movement within a space-limed area, in which case, however, an error may be generated in moving a pointing to a target position if a moving distance is short, for example, when an object is placed within a short distance, or when a fine movement within a space-limed area is required, for example, when the size of a target is very small.

Meanwhile, an input interface using a touch pad allows a user to use a thumb, thereby enables relatively fine, precise pointing. However, since the input interface of this type has a relatively small size, suggesting that a range of moving space is limited, the user needs to scroll the touch pad several times in order to move the pointer to a distant target position. Thus, the pointing efficiency may deteriorate when the pointer is moved to a distant area.

SUMMARY OF THE INVENTION

The present invention provides a dual pointing device and method, which can ensure improved pointing accuracy while moving a pointer over a wide range of area in a 3-D space.

The present invention also provides a dual pointing device and method that allows a long-distance movement and accurate pointing by combining the principle of motion and touch-based sensing.

These and other objects of the present invention will be described in or be apparent from the following description of the preferred embodiments.

According to an aspect of the present invention, there is provided a dual pointing device based on three-dimensional (3-D) motion and touch sensors, the dual pointing device including a sensor including a first sensor sensing a motion in a space and a second sensor sensing a touch input, a movement-mode-determining unit determining a movement mode type using signals of the first and second sensors, and a pointer-moving unit moving a pointer on a display screen using at least one of the signals of the first sensor and the second sensor according to the determined movement mode type.

According to another aspect of the present invention, there is provided a dual pointing method based on three-dimensional (3-D) motion and touch sensors, the dual pointing method including detecting a first signal of a first sensor sensing a motion in a space and a second signal of a second sensor sensing a touch input, determining a movement mode type using the first signal and the second signal, and moving a pointer on a display screen using at least one of the first and second signals of the first and second sensors according to the determined movement mode type.

According to another aspect of the present invention, there is provided a dual pointing method based on three-dimensional (3-D) motion and touch sensors, the dual pointing method including detecting a first signal and a second signal from a first sensor and second sensor, respectively, the first sensor sensing a motion in a space and the second sensor sensing a touch input, calculating a pointer movement amount on a display screen by combining the first signal and the second signal, and moving a pointer position on the display screen using the calculated pointer movement amount.

According to another aspect of the present invention, there is provided a dual pointing method of a dual pointing device including a first sensor for pointing in a three-dimensional (3-D) space and a second sensor for pointing by a touch input, the dual pointing method including determining whether there is an input signal of the second sensor, calculating a pointing movement amount on a display screen using a second signal detected by the second sensor if there is an input signal of the second signal, and moving a pointer on the display screen using the calculated pointer movement amount.

According to another aspect of the present invention, there is provided a dual pointing method of a dual pointing device including a first sensor for three-dimensional (3-D) space pointing and a second sensor for touch-input-based pointing, the dual pointing method including calculating a first pointer movement amount on a display screen by sensing the first signal using the first sensor, determining whether there is an input signal from the second sensor, if there is an input signal from the second sensor, calculating a second pointer movement amount on the display screen by sensing a second signal using the second sensor, and moving a pointer on the display screen by combining the first and second pointer movement amounts.

BRIEF DESCRIPTION OF THE DRAWINGS

The above and other features and advantages of the present invention will become apparent by describing in detail preferred embodiments thereof with reference to the attached drawings in which.

DETAILED DESCRIPTION OF THE INVENTION

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The present invention is described hereinafter with reference to flowchart illustrations of a dual pointing device and method based on 3-D motion and touch sensors according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to create means for implementing the functions specified in the flowchart block or blocks. These computer program instructions may also be stored in a computer usable or computer-readable memory that can direct a computer or other programmable data processing apparatus to function in a particular manner, such that the instructions implement the function specified in the flowchart block or blocks. The computer program instructions may also be loaded onto a computer or other programmable data processing apparatus to cause a series of operational steps to be performed on the computer or other programmable apparatus to produce a computer implemented process for implementing the functions specified in the flowchart block or blocks.

In addition, each block may represent a module, a segment, or a portion of code, which may comprise one or more executable instructions for implementing the specified logical functions. It should also be noted that in other implementations, the functions noted in the blocks may occur out of the order noted or in different configurations of hardware and software. For example, two blocks shown in succession may, in fact, be executed substantially concurrently, or the blocks may sometimes be executed in reverse order, depending on the functionality involved.

Hereinafter, the present invention will be explained in more detail with reference to the accompanying drawings.

Figure 1A:
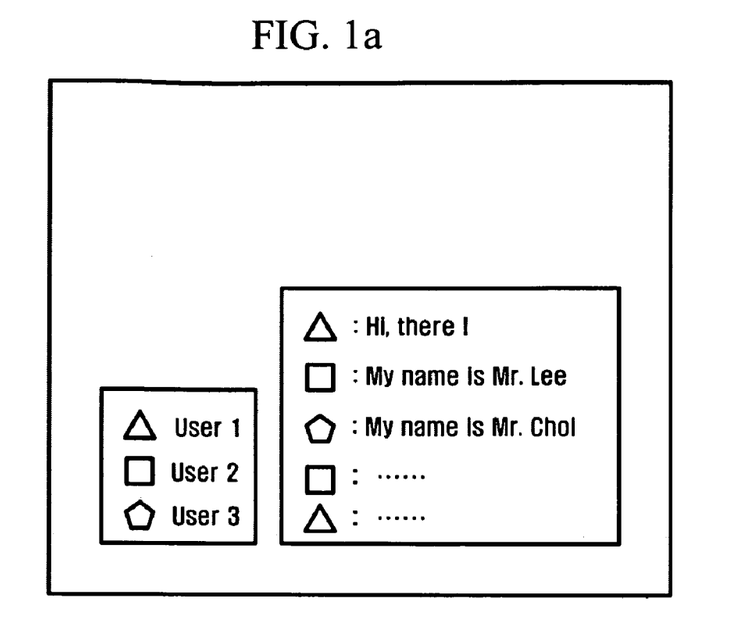
FIG. 1A is an illustration showing that a window is selected by a pointer in order for viewers of Internet protocol televisions (IPTVs) to chat with one another.
Figure 1B:
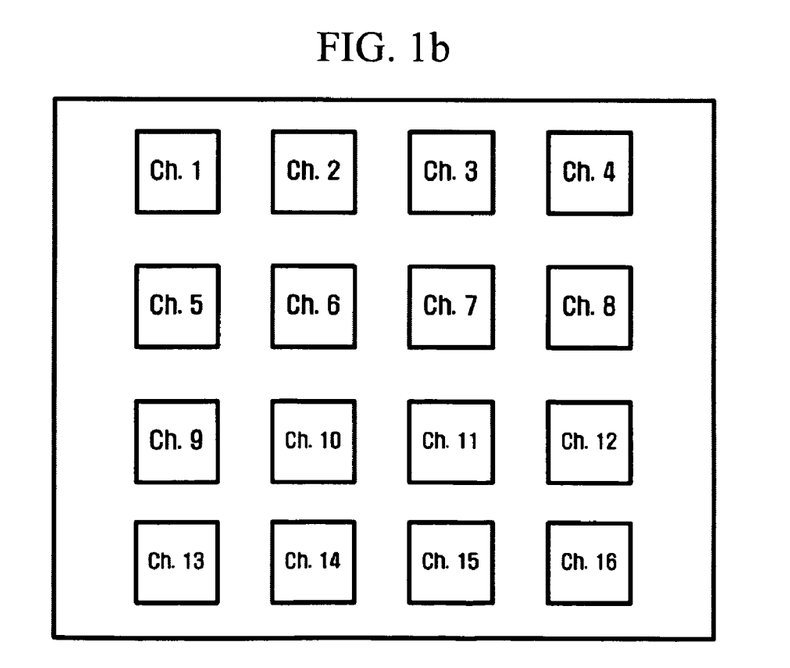
FIG. 1B is an illustration showing that an IPTV channel list is selected by a pointer.
Figure 1C:
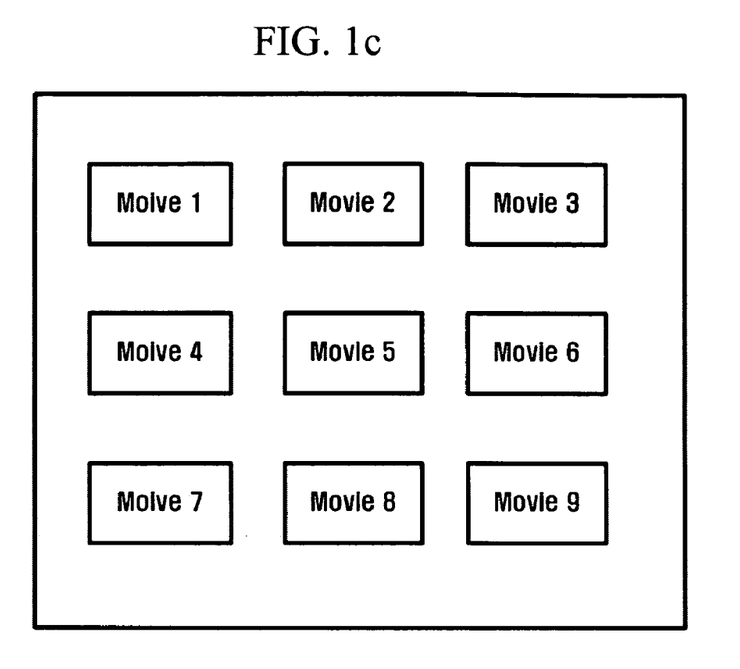
FIG. 1C is an illustration showing that a movie is selected from a video on demand list by a pointer.
Figure 1D:
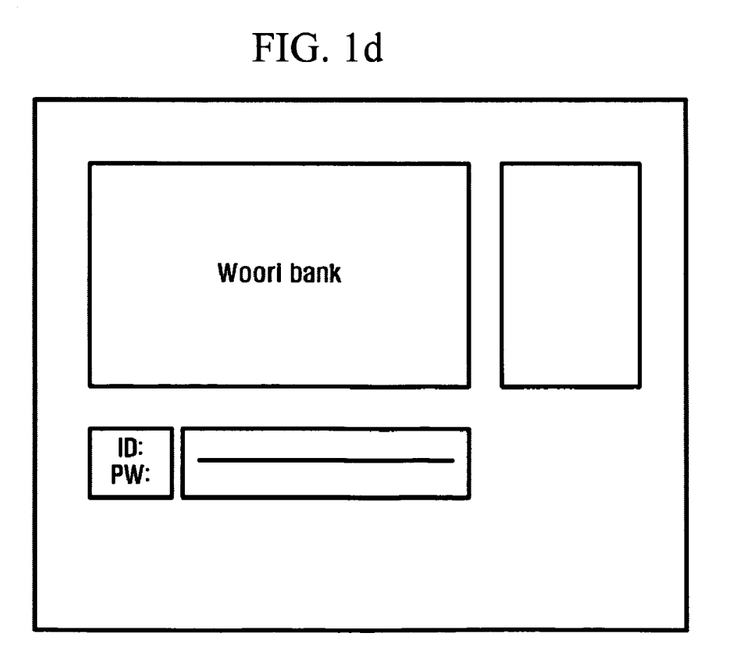
FIG. 1D is an illustration showing that an icon is selected in an Internet banking service.

FIGS. 1A-1D shows illustrating pointing tasks on an Internet protocol television, in which FIG. 1A is an illustration showing that a window is selected by a pointer in order for viewers of an Internet protocol television (IPTV) to chat with one another, FIG. 1B is an illustration showing that an IPTV channel list is selected by a pointer, FIG. 1C is an illustration showing that a movie is selected from a video on demand list by a pointer, and FIG. 1D is an illustration showing that an icon is selected in an Internet banking service.

Referring to FIGS. 1A-1D, a user should move a pointer to choose one of a variety of optional items, such as icons, menus, and lists, which are displayed on a screen of the IPTV in order to use various Internet services. The IPTV means a service or a device which can be provided with an information service, moving picture content or broadcasting programs through a television receiver.

A device and method according to an embodiment of the present invention have a pointer which is moved on a large display screen. For example, a pointing device used in the IPTV may be operated differently from that used in a personal computer (PC).

For instance, a mouse, which is generally used to move the pointer on a screen of the PC, requires a flat surface, such as a desk. However, it is not likely that a television, which a viewer is watching in a sitting position at a distance of about 2 to 3 meters, has a horizontal flat surface like a desk. Thus, a pointing device and method are required for the IPTV in order to accurately direct a pointer on a display screen.

Figure 2A:
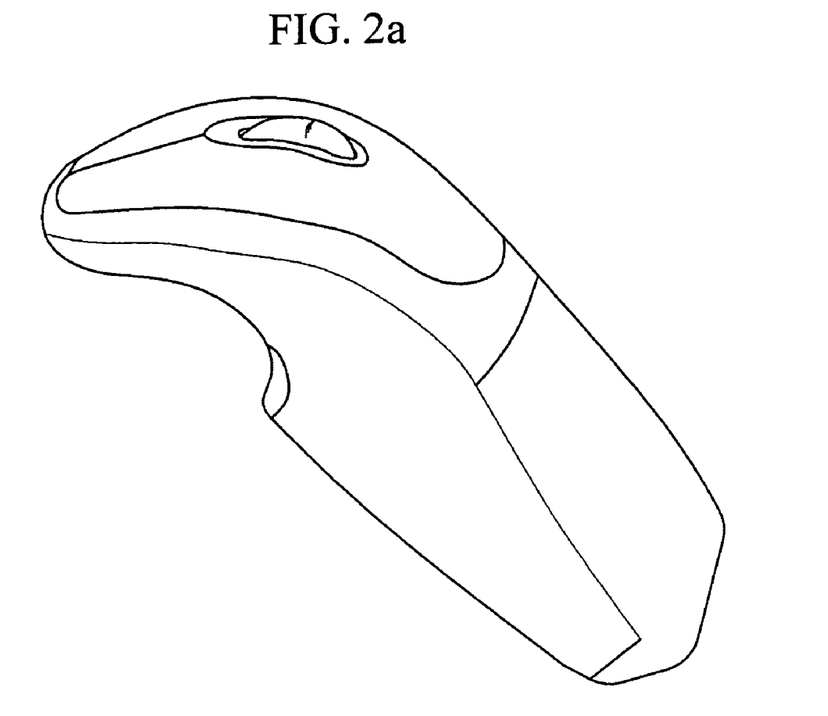
FIG. 2A shows an exemplary illustration of a 3-D mouse which can perform pointing according to the 3-D motion of a hand.
Figure 2B:
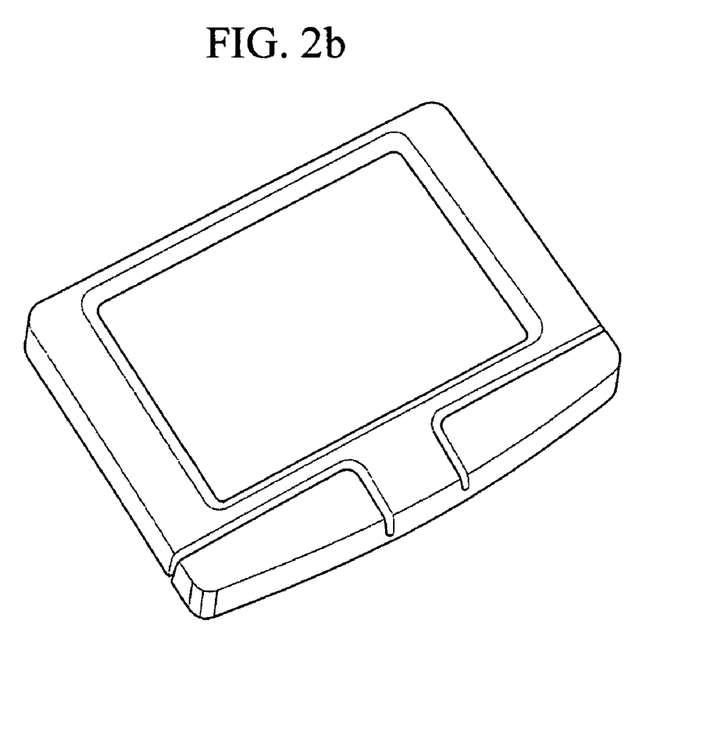
FIG. 2B shows an exemplary illustration of a general touch pad.
Figure 3A:
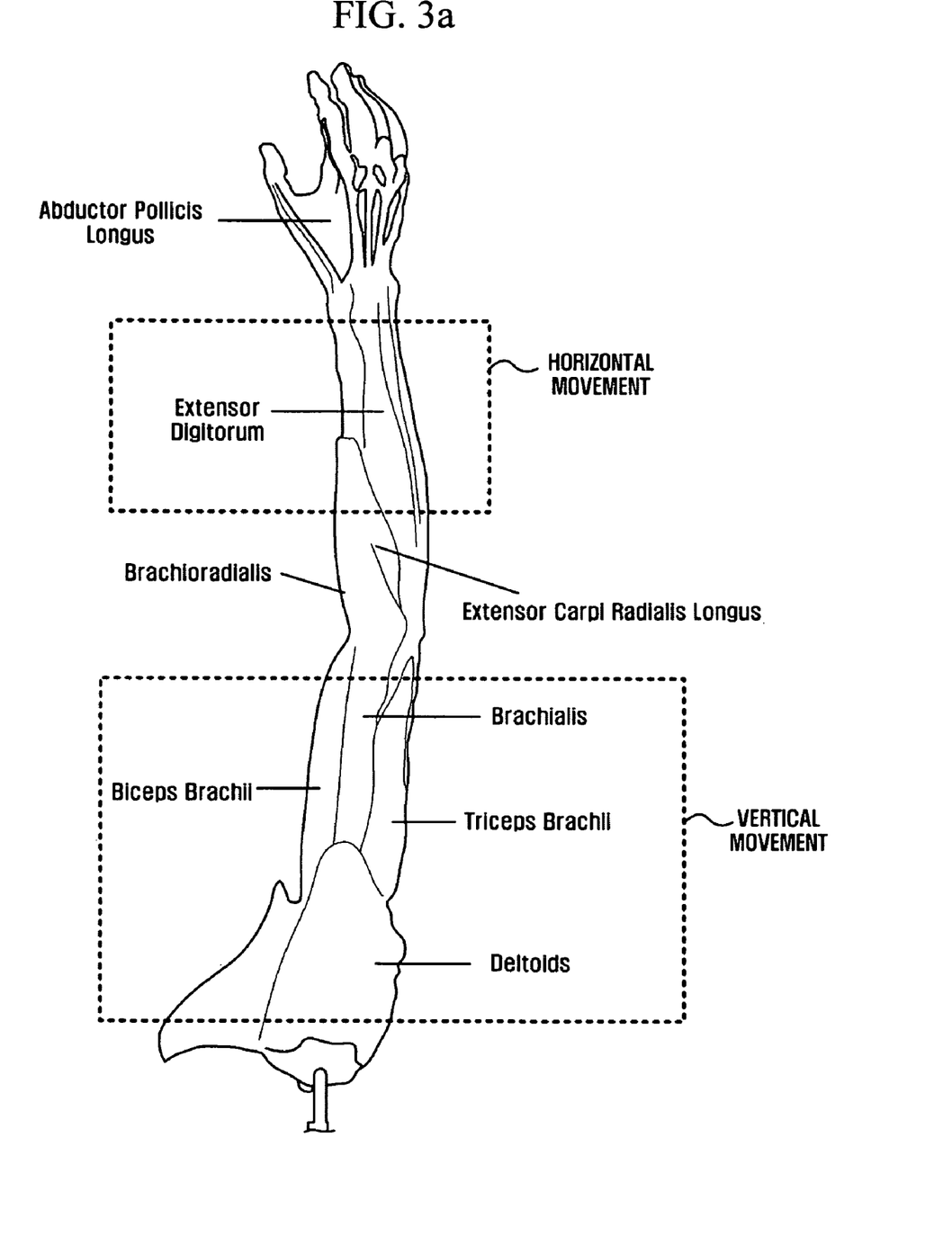
FIG. 3A is an illustration showing muscles and nerves of a human body, which are used for operating a 3-D mouse.
Figure 3B:
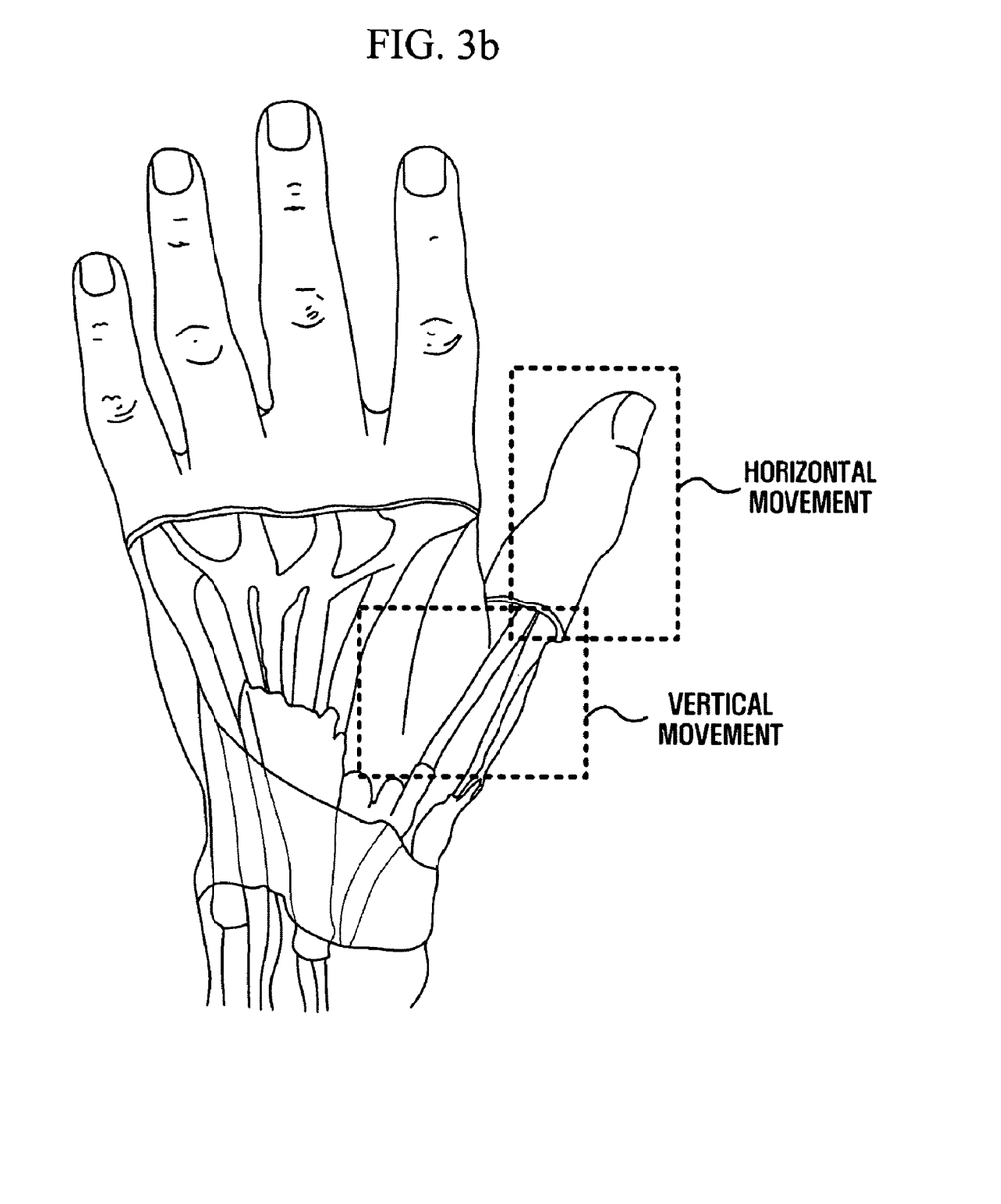
FIG. 3B is an illustration showing the muscle movement of a hand which uses a touch pad.
Figure 3C:
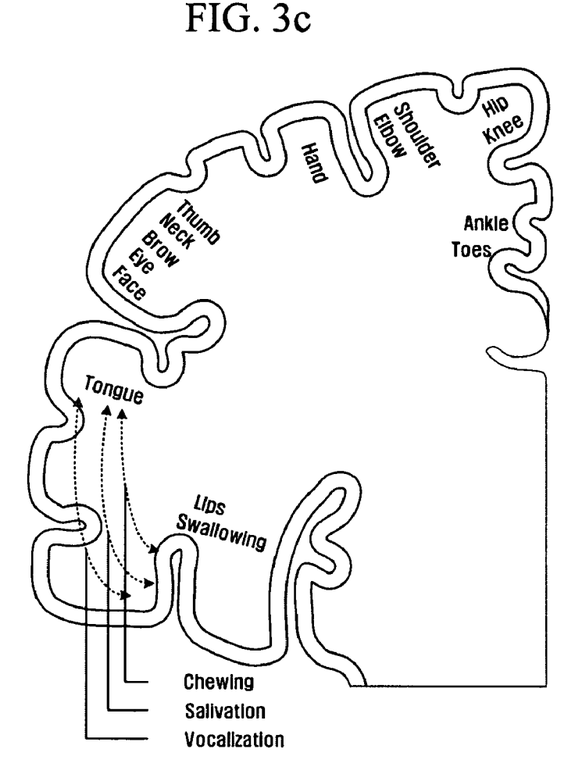
FIG. 3C is an illustration schematically showing sizes of areas of a brain which control the movements of body organs.
Figure 3D:
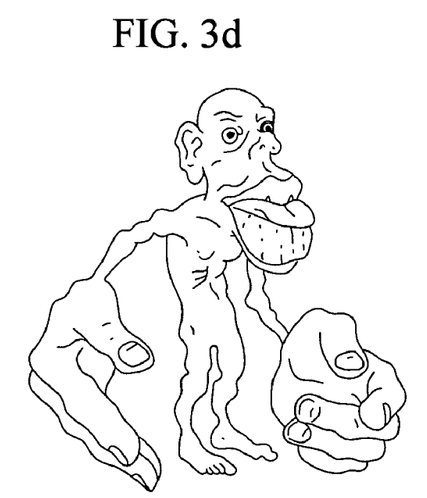
FIG. 3D is an illustration of various organs of a human body, in which the organs are visualized to be in proportion to sizes of the areas of the brain controlling the organs.

FIG. 2A shows an exemplary illustration of a 3-D mouse which can perform pointing according to the 3-D motion of a hand, FIG. 2B shows an exemplary illustration of a general touch pad, FIG. 3A is an illustration showing muscles and nerves of a human body, which are used for operating a 3-D mouse, FIG. 3B is an illustration showing the muscle movement of a hand which uses a touch pad, FIG. 3C is an illustration schematically showing sizes of areas of a brain which control the motions of body organs, and FIG. 3D is an illustration of various organs of a human body, in which the organs are visualized to be in proportion to sizes of the areas of the brain controlling the organs.

FIGS. 2A and 2B show a 3-D mouse and touch pad, respectively. The mouse and touch pad have different advantages and disadvantages.

Referring to FIGS. 2A and 2B, for example, a user of the 3-D mouse may mainly use upper arm muscles when moving the 3-D mouse in a vertical direction, and use lower arm muscles when moving the 3-D mouse in a horizontal direction.

Referring to FIGS. 2B and 3B, when a user moves his/her thumb for a scrolling movement on the touch pad, the user may use muscles connected with joints of the thumb for vertically scrolling on the surface of the touch pad, and may use muscles between the thumb and the index finger for horizontally scrolling on the surface of the touch pad.

Sizes of various brain areas controlling the motion of a human body will be described with reference to FIGS. 3C and 3D in the following. That is, an area of the brain which controls shoulders and arms is small, while an area of the brain which controls fingers is substantially large. Since the muscles involved with the arm movement are moved over a wide range (angle and distance), such muscles are easily associated with moving the pointer on the display screen over a wide area of area and at a rapid speed. However, since the size of the area of the brain related to the arm muscles is small, accurately controlling the pointer is difficult to achieve. In contrast, since the area of the brain related to finger muscles is a large area, accurate control is easy to achieve. However, the finger movement range on the touch pad is limited to several centimeters, when compared to the arm movement range. Considering the characteristics of the human body and device, a 3-D pointer enables movement of a wide range of area but still has low accuracy. By contrast, the touch pad achieves accurate movement of the pointer but still is limited in a movement range.

Accordingly, in an embodiment of the present invention, a pointing device and method are provided, which can control a pointer or a cursor over a wide area of a display screen with accuracy.

Figure 4:
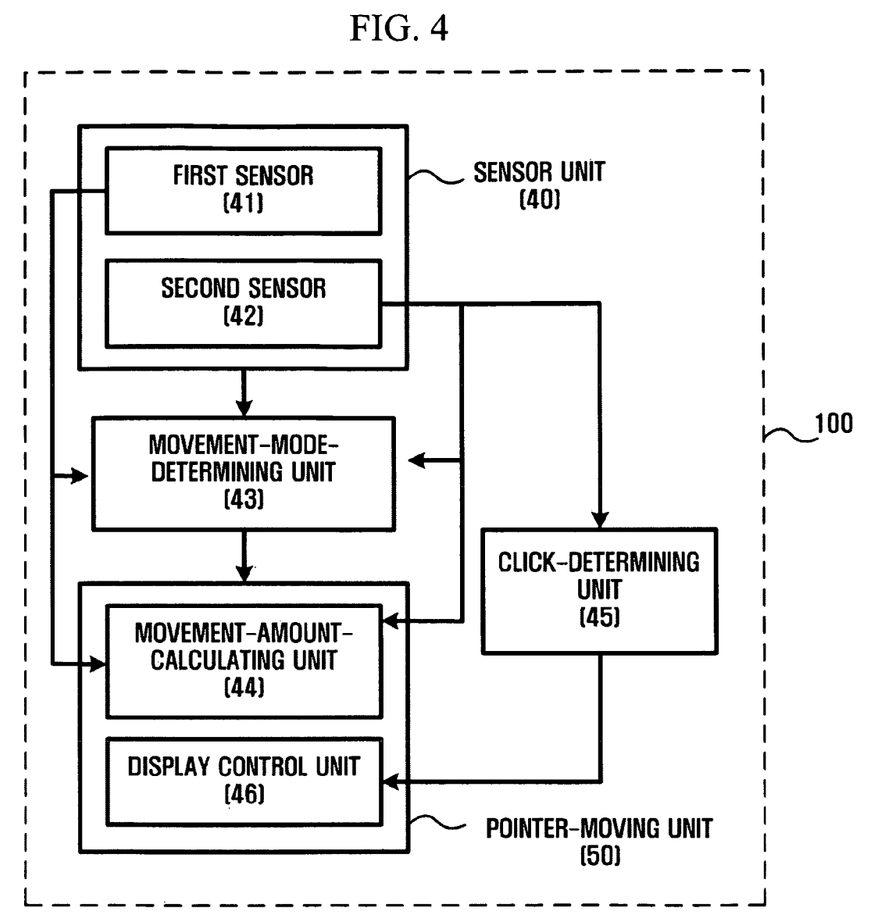
FIG. 4 is a block diagram of a dual pointing device based on 3-D motion and touch sensors, according to an embodiment of the present invention.

FIG. 4 is a block diagram of a dual pointing device based on 3-D motion and touch sensors, according to an embodiment of the present invention.

Referring to FIG. 4, a dual pointing device 100 based on 3-D motion and touch sensors includes a sensor unit 40, a movement-mode-determining unit 43, and a pointer-moving unit 50. The sensor unit 40 includes a first sensor 41 and a second sensor 42, and the pointer-moving unit 50 may include a movement-amount-calculating unit 44 and a display control unit 46.

The first sensor 41 detects the movement of the pointing device 100 or the body of the pointing device 100. The first sensor 41 may also detect the movement of the pointing device 100 and generate a first signal when a user moves or rotates the pointing device 100 in an arbitrary direction in a 3-D space.

The first sensor 41 may be an angular velocity sensor or an acceleration sensor to detect the movement of the pointing device 100 or the body of the pointing device 100. For example, a gyroscope may be used as an angular velocity sensor. The angular velocity sensor can obtain the movement of the pointing device 100 or the body of the pointing device 100 as a rotational movement with respect to orthogonal axes. The amounts of rotation with respect to the three axes can be represented as pitch, roll, and yaw, respectively. The pitch, the roll, and the yaw can be calculated by the angular velocity sensor.

Alternatively, the first sensor 41 may be an acceleration sensor sensing data about accelerations with respect to the axes perpendicular to one another. The acceleration sensor may detect acceleration by transforming dynamic properties of piezoelectric materials into electric properties, or detect acceleration by transforming dynamic properties into electric properties even when not only a compressive force but also a shear force are applied to the piezoelectric materials. Furthermore, various types of acceleration sensors, including a vibration-type sensor, a strain gauge-type sensor, an electrodynamic sensor, a servo-type sensor, and so on, can be employed to detect the movement of the pointing device 100 or the body of the pointing device 100.

In addition, the first sensor 41 may be configured by combining an angular velocity sensor and an acceleration sensor. The first sensor 41 may also be configured to detect the movement of the body of the pointing device 100.

The second sensor 42 generates a second signal by detecting an external touch input. The second sensor 42 may be a sensor having a surface with a constant area, by which a touch input can be detected. The second sensor 42 is a touch sensor that generates a second signal by detecting whether or not there is a touch of an object, such as a user's finger(s), or a touch pen. The second sensor 42 may be, for example, a touch pad, a capacitive touch sensor, or a touch screen. The touch sensor may be implemented in various manners. For example, the touch sensor may be implemented as a pressure-sensitive touch sensor. The pressure-sensitive touch sensor detects a pressure reacting with a compactly installed sensor wire, the pressure applied to a surface of a touch screen. Another example of the touch sensor is a capacitive touch sensor. The capacitive touch sensor detects a touch by measuring a loss in charge. The measuring of the loss in the charge is performed such that a surface of a touch screen is charged (current flow), multiple sensors are installed around the touch screen, and the loss in the charge represented by a capacitance change is sensed when the surface of the touch screen is touched.

The second sensor 42 generates the second signal by detecting whether there is a scroll or drag input, such as a user's finger or a touch pen, on the surface of the second sensor 42. The second sensor 42 detects a touch movement amount for a scroll or drag input activated by a user's finger. As described above, the sensor unit 40 according to an embodiment of the present invention can detect a motion in a space and a touch input. For example, the movement of the pointing device 100, which is moved upward and downward and left and right while held by a user's hand, can be detected by the first sensor 41 and scrolling and dragging actions made by the user's finger(s) can be sensed by the second sensor 42 when the user touches the second sensor 42. The pointer appearing on the display screen can be accurately controlled over a wide range of area by the signals generated by the first and second sensors 41 and 42.

The movement-mode-determining unit 43 determines a movement mode type using the signals of the first and second sensors 41 and 42. For example, the movement-mode-determining unit 43 may determine whether an externally input signal is in a long-distance movement mode or a short-distance movement mode using the first signal sensed from the first sensor 41 and the second signal sensed from the second sensor 42. Here, the externally input signal, which is generally input by a user, is input to the first sensor 41 and the second sensor 42 of the pointing device 100. For instance, the user can scroll or drag the touch pad of the body of the pointing device 100 with his/her finger(s) while moving the body of the pointing device 100.

In the long-distance movement mode, the pointer is moved in a wide area of the display screen by the pointing device 100, and in the short-distance movement mode, the pointer is moved in a narrow area of the display screen by the pointing device 100. The difference between the long-distance and the short-distance may be defined based on a predetermined threshold by the user, a system, or the pointing device 100. For example, the movement mode may be determined as a long-distance movement mode if a value of the signal is less than the predetermined threshold, or determined as a short-distance movement mode if a value of the signal is greater than the predetermined threshold.

The movement-mode-determining unit 43 can determine the movement mode type in various conditions. According to an embodiment of the present invention, if there is no touch input on the second sensor 42, it can be determined that the pointer is to be moved by moving the body of the pointing device 100, so that the movement mode type is determined as a long-distance movement mode. In contrast, if there is a touch input to the second sensor 42, it can be determined that there will be user's touch input, so that the movement mode type is determined as a short-distance movement mode.

The pointer-moving unit 50 moves the pointer appearing on the display screen, using at least one of the first and second signals of the first and second sensor 41 and 42 according to the determined movement mode type.

The pointer-moving unit 50 moves the pointer using one or more signals of the first and second signals of the first and second sensors 41 and 42 by various methods. For example, if the determined movement mode type is a long-distance movement mode, the pointer-moving unit 50 may move the pointer using the first signal of the first sensor 41. If the determined movement mode type is a short-distance movement mode, or the pointer-moving unit 50 may move the pointer using the second signal of the second sensor 42.

In another example, the pointer-moving unit 50 may move the pointer on the display screen according to the calculated movement amount by calculating the movement amount of the pointer on the display screen by assigning different weights to the first signal of the first sensor 41 and the second signal of the second sensor 42.

The pointer-moving unit 50 includes the movement-amount-calculating unit 44 and the display control unit 46. The movement-amount-calculating unit 44 calculates the movement amount of the pointer using at least one of the signals of the first sensor 41 and the second sensor 42.

The movement-amount-calculating unit 44 can calculate the movement amount of the pointer by various methods. In the long-distance movement mode, for example, the movement amount can be calculated using the first signal of the first sensor 41. In contrast, in the short-distance movement mode, the movement amount can be calculated using the second signal of the second sensor 42. In still another example, in the long-distance movement mode, a high weight of the movement amount of the pointer on the display screen may be assigned to the first signal of the first sensor 41 than to the second signal of the second sensor 42. In contrast, in the short-distance movement mode, a low weight of the movement amount of the pointer on the display screen may be assigned to the first signal of the first sensor 41 than to the second signal of the second sensor 42. In this way, the movement amount of the pointer can be effectively calculated by assigning different weights to the corresponding signals in cases of the short-distance movement mode and the long-distance movement mode.

The movement-amount-calculating unit 44 will now be described in more detail.

Assuming that $W_x$ and $W_y$ denote horizontal and vertical rotation values output from the first sensor 41, and $d_x$ and $d_y$ denote horizontal and vertical movement amounts of the pointer, the following Equation (1) is satisfied:

$$\begin{bmatrix} d_x \\ d_y \end{bmatrix} = D_g(w_x, w_y) \quad (1)$$

Here, a function $D_g$ that produces a movement amount of the pointer on the display screen is a monotonic increasing function, in which output values increase as $W_x$ and $W_y$ values increase, and when $D_g(W_x, W_y)=(c \times w_x, c \times w_y)$, the movement amount of the pointer on the display screen changes in a linear fashion. However, in a case where the movement amount of the pointer on the display screen exceeds a linearly increasing range, the pointer will move in a nonlinear fashion.

In addition, assuming that $f_x$ and $f_y$ denote horizontal and vertical moving distances of the finger on the second sensor 42, respectively, and $e_x$ and $e_y$ denote horizontal and vertical movement amounts of the pointer as the results of the finger motion, the moving distance of the pointer on the display screen is given by:

$$\begin{bmatrix} e_x \\ e_y \end{bmatrix} = D_f(f_x, f_y) \quad (2)$$

Here, a function $D_f$ that produces a movement amount of the pointer on the display screen is a monotonic increasing function, in which output values increase as $f_x$ and $f_y$ increase. The function $D_f$ can be either a linear function or a nonlinear function.

An example of a method of combining both movement amounts d and e is given by:

$$\begin{bmatrix} l_x \\ l_y \end{bmatrix} = S_g(m) \cdot D_g(w_x, w_y) + S_f(m) \cdot D_f(f_x, f_y) \quad (3)$$

Here, "m" is an index representing the movement mode type, which may be either a long-distance movement mode or a short-distance movement mode. In addition, $S_g(m)$ indicates sensitivity with respect to the movement amount based on the first sensor 41 according to the movement mode type, and $S_f(m)$ indicates sensitivity with respect to the movement amount based on the second sensor 42 according to the movement mode type. As described above, variable weights are assigned according to the movement mode type, thereby calculating the movement amount of the pointer using the signals of the first and second sensors 41 and 42.

Alternatively, the movement-amount-calculating unit 44 may calculate the movement amount of the pointer using Equation (1) in the long-distance movement mode, and calculate the movement amount of the pointer using Equation (2) in the short-distance movement mode.

Referring to FIG. 4, the display control unit 46 controls the pointer to be moved using the movement amount of the pointer obtained by the movement-amount-calculating unit 44. The display control unit 46 can update the position of the pointer by removing the previous pointer from the display screen while moving the current pointer by the calculated movement amount.

If a touch of less than a predetermined length of time or a predetermined length of area is sensed by the second sensor 42, a click-determining unit 45 determines the touch as a click signal. In this case, the click signal is a signal for selecting a point on the display screen. For example, in a state in which multiple contents are arranged on the display screen, if a click signal is input, the content corresponding to an input area of the click signal may be selected and reproduced.

As such, the click signal may be sensed by a tapping motion, and the user's selection can be easily determined by the click-determining unit 45.

As described above, according to the embodiment of the present invention, the pointer is moved using a first sensor sensing a motion and a second sensor sensing a touch input. That is, the position of the pointer can be controlled accurately and fast by sensing a 3-D motion and a touch input. Also, the user can easily control both large movement and fine movement of the pointer on a display screen using a pointing device. In addition, the use of a pointing device enables a user to easily control the position of a pointer in various positional states, such as in a sitting pose, a lying pose, or a standing pose.

Figure 5:
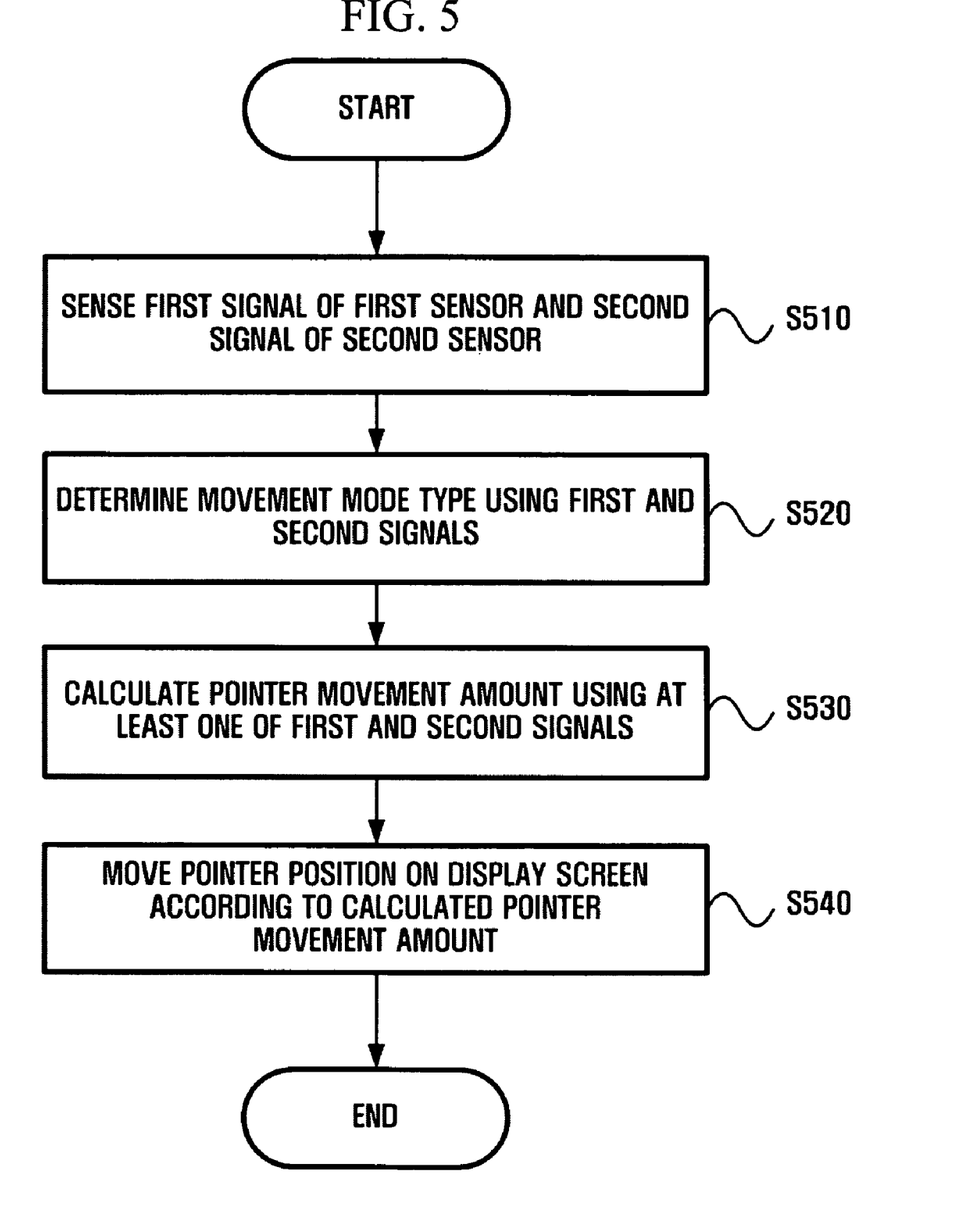
FIG. 5 is a flowchart of a dual pointing method based on 3-D motion and touch sensors, according to an embodiment of the present invention.

FIG. 5 is a flowchart of a dual pointing method based on 3-D motion and touch sensors, according to an embodiment of the present invention.

Referring to FIG. 5, a first signal and a second signal are detected from a first sensor and a second sensor, respectively (operation S510). The first sensor is a sensor capable of detecting the movement of the pointing device 100 or a body of the pointing device 100. For example, the first sensor may be an angular velocity sensor or an acceleration sensor.

A movement mode type is determined using the detected first and second signals (operation S520). Here, the movement mode type can be roughly classified into a long-distance movement mode and a short-distance movement mode. As an example, if the second signal is detected, the movement mode type is determined as the short-distance mode. If the second signal is not detected, the movement mode type is determined as the long-distance mode.

The movement amount of the pointer on the display screen is calculated using at least one of the detected first and second signals (operation S530). The movement amount of the pointer may be obtained by assigning different weights to the first and second signals according to the determined movement mode type.

In addition, in the long-distance movement mode, the movement amount of the pointer is calculated using the first signal, and in the short-distance movement mode, the movement amount of the pointer is calculated using the second signal.

The pointer is moved on the display screen using the calculated movement amount (operation S540). The pointer is moved to a new position on the display screen by adding the movement amount of the pointer to the previous position of the pointer, while deleting the previous position of the pointer from the display screen.

According to the above-described embodiment of the present invention, the use of 3-D motion and touch sensors enables fast movement of the pointer over a wide area on the display screen and accurate pointing control of the pointer by varying the movement amount of the pointer according to the movement mode type.

Meanwhile, the movement amount of the pointer, which is obtained by the first signal, is referred to as a first pointer movement amount, and the movement amount of the pointer, which is obtained by the second signal, is referred to as a second pointer movement amount. As described above, Equation (1) can be used to calculate the first pointer movement amount, Equation (2) can be used to calculate the second pointer movement amount, and Equation (3) can be used to combine the first pointer movement amount and the second pointer movement amount.

Alternative examples of the method of combining the first pointer movement amount and the second pointer movement amount include a non-overlapping pointing method and an overlapping pointing method. In the non-overlapping pointing method, the first signal and the second signal are separately used in the combining procedure. In the overlapping pointing method, the first and second signals are simultaneously used in the combining procedure.

Figure 6:
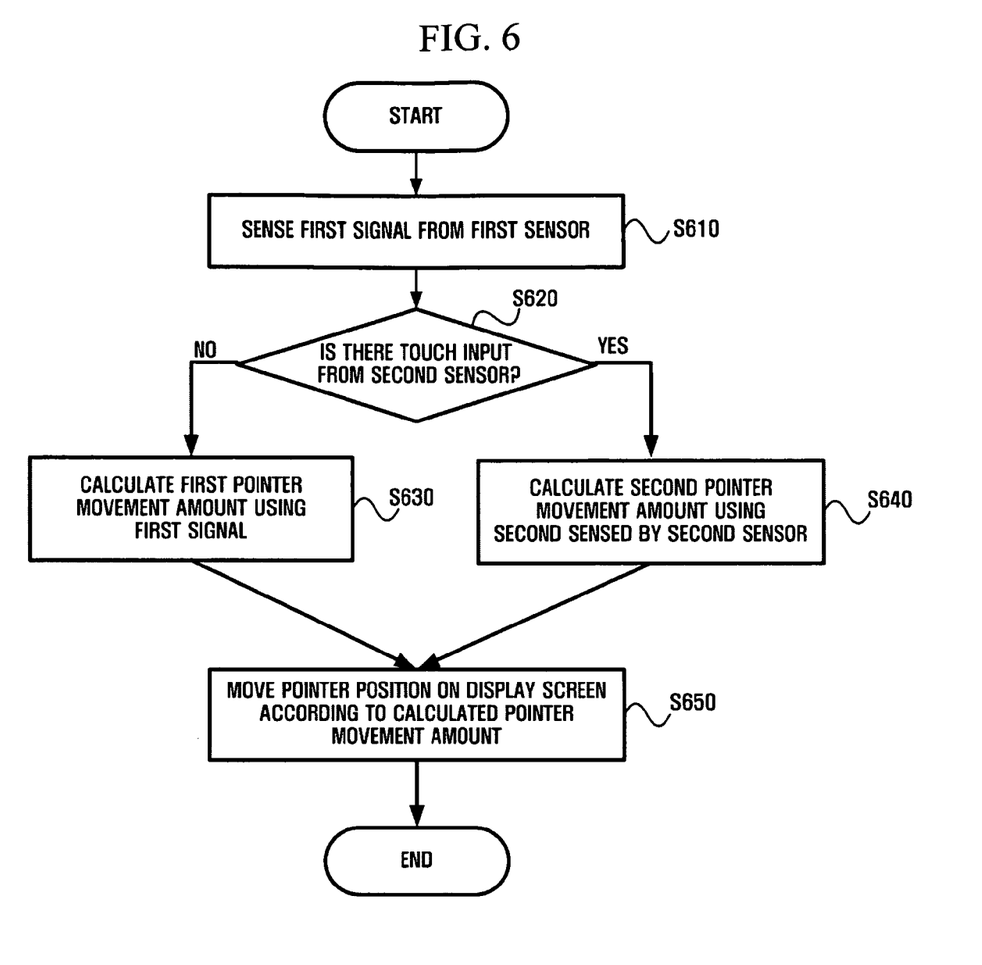
FIG. 6 is a flowchart of a non-overlapping pointing method based on 3-D motion and touch sensors, according to an embodiment of the present invention.

FIG. 6 is a flowchart of a non-overlapping pointing method based on 3-D motion and touch sensors, according to an embodiment of the present invention.

Referring to FIG. 6, a first signal is detected by a first sensor (operation S610). Also, it is detected whether there is a touch input from a second sensor (operation S620). If there is no touch input, a first pointer movement amount is calculated using the first signal (operation S630). At this time, the first pointer movement amount can be calculated by Equation (1).

If there is a touch input, the second signal of the second sensor is detected, and the second pointer movement amount is calculated using the second signal (operation S640). At this time, the second pointer movement amount can be calculated by Equation (2).

However, in the case of employing Equation (3), $S_g$(m=long-distance movement mode)=0 and $S_f$(m=short-distance movement mode)=1 are applied as weights if there is a touch input, and $S_g$(m=long-distance movement mode)=1 and $S_f$(m=short-distance movement mode)=0 are applied as weights if there is no touch input.

Once the pointer movement amount is obtained, the pointer is moved on the display screen using the obtained pointer movement amount (operation S650).

Figure 7:
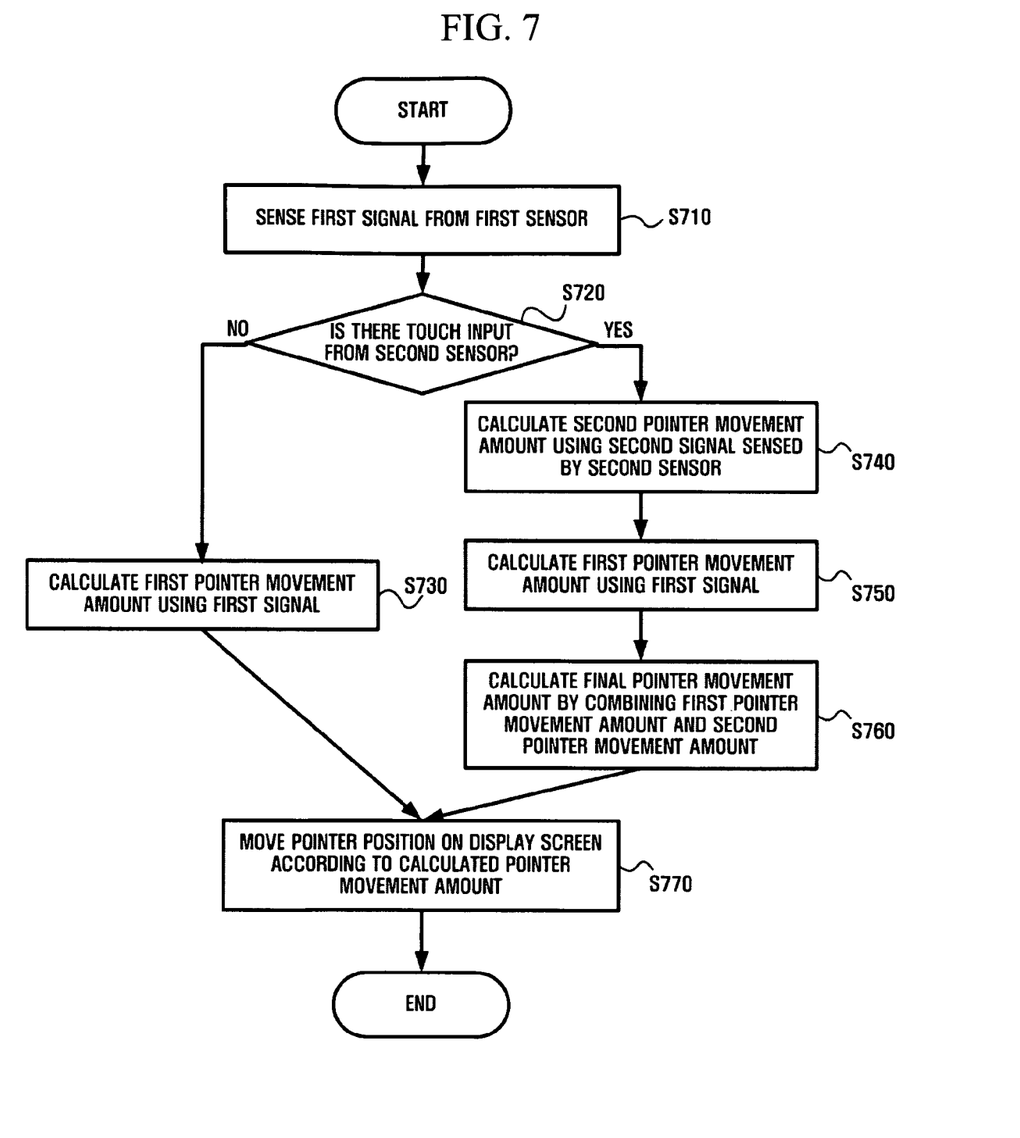
FIG. 7 is a flowchart of an overlapping pointing method based on 3-D motion and touch sensors, according to an embodiment of the present invention.

FIG. 7 is a flowchart of an overlapping pointing method based on 3-D motion and touch sensors, according to an embodiment of the present invention.

Referring to FIG. 7, in the overlapping method, the pointer movement amount can be calculated in consideration of pointer movement using both first and second signals.

First, the first signal is detected from a first sensor (operation S710). It is determined whether there is a touch input from a second sensor (operation S720). If there is no touch input, the first pointer movement amount is calculated using the detected first signal (operation S730). At this time, the first pointer movement amount can be calculated by Equation (1).

If there is a touch input, the second signal is detected from the second sensor and the second pointer movement amount is calculated using the second signal (operation S740). At this time, the second pointer movement amount can be calculated by Equation (2). Also, the first pointer movement amount is obtained using the detected first signal (operation S750). The final pointer movement amount is obtained using the calculated first and second pointer movement amounts (operation S760). In the case of using Equation (3) in calculating a final pointer movement amount, let $S_g$(m=short-distance movement mode)<$S_f$(m=long-distance movement mode) in a short-distance movement mode in which there is a touch input, or let Sg(m=short-distance movement mode)>Sf (m=long-distance movement mode) in a long-distance movement mode in which there is no touch input.

Once the pointer movement amount is obtained, the pointer is moved on the display screen using the obtained pointer movement amount (operation S770).

As described above, the first pointer movement amount and the second pointer movement amount can be calculated by independently using the first signal of the first sensor and the second signal of the second sensor with respect to the non-overlapping mode and the overlapping mode. In addition, pointer movement amounts in the long-distance movement mode and short-distance movement mode can be obtained by adaptively applying different weights according to the movement mode type, thereby accurately controlling the pointer position in either the long-distance movement mode or the short-distance movement mode.

Although the above-described embodiment has shown that the first signal of the first sensor is detected, it should be obvious to those who are skilled in the art that the second signal may first be detected by the second sensor.

Figure 8:
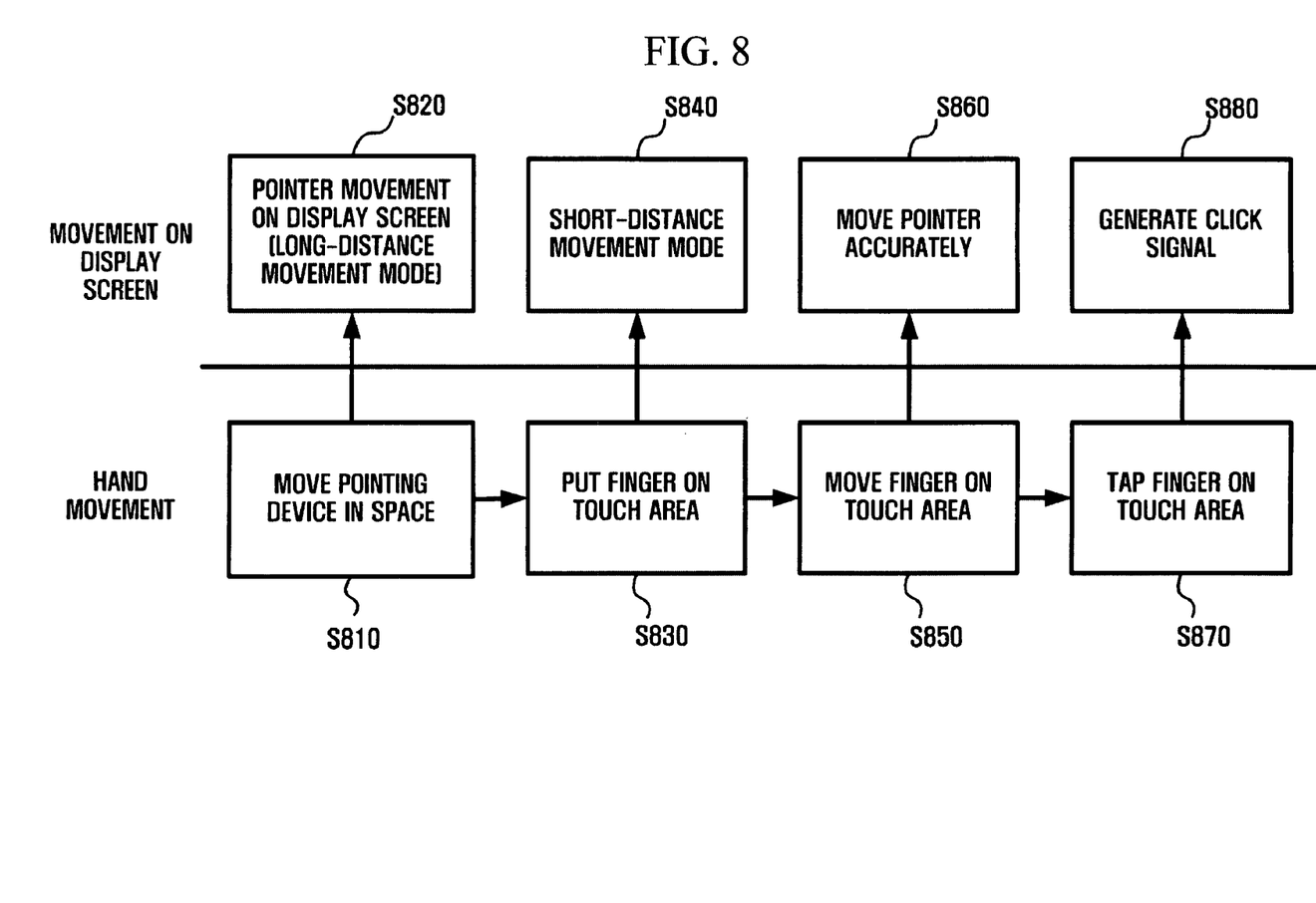
FIG. 8 is a flowchart of processing signal in a dual pointing device based on 3-D motion and touch sensors according to an embodiment of the present invention.

FIG. 8 is a flowchart of processing signal in a dual pointing device based on 3-D motion and touch sensors according to an embodiment of the present invention.

Referring to FIG. 8, if a user moves a pointing device in a space and a pointer on a display screen is moved accordingly (operations S810 and S820). In this case, the pointer is moved fast over a wide range of area on the display screen by a first signal detected by a first sensor in a long-distance movement mode.

If the user puts his/her finger on a touch area (operation S830), the movement mode type is changed into a short-distance movement mode (operation S840). Upon movement of the user's finger on the touch area, a second signal is detected from a second sensor (operation S850), and the position of the pointer on the display screen is moved finely, which is detected by the second signal (operation S860).

Meanwhile, if the user moves his/her finger for less than a predetermined length of area or for less than a predetermined length of time (for example, a tapping motion; operation S870), a click signal may be generated (operation S880). A particular object or area may be selected by the click signal. Alternatively, the click signal may be generated at the moment when the user removes his/her finger from the touch area. The generating of the click signal is described as an exemplary embodiment of the present invention, and the present invention is not limited thereto.

As described above, the pointing device according to the present invention can be advantageously used for users who conduct 3-D pointing related activities, such as icon or a menu selection on a PC monitor or TV screen. The pointing device can also be employed to a small hand-held portable projector or a compact laser pointer for emitting a light beam on a target position. Further, the pointing device can be used in changing the direction of a lens.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A dual pointing device based on three-dimensional (3-D) motion and touch sensors, comprising:
   a sensor unit including a first sensor to sense a motion in a space and a second sensor to sense a touch input;
   a movement-mode-determining unit to determine a movement mode type using signals of the first and second sensors;
   a movement-amount-calculating unit to calculate a pointer movement amount using one or more signals of the first and second sensors; and
   a pointer-moving unit to move a pointer on a display screen using at least one of the signals of the first sensor and the second sensor according to the determined movement mode type,
   wherein, if the movement mode is a long-distance movement mode, the movement-amount-calculating unit assigns a higher weight to the pointer movement amount on the display screen appearing by the first signal of the first sensor than to the pointer movement amount on the display screen appearing by the second signal of the second sensor.

2. The dual pointing device of claim 1, wherein the pointer-moving unit comprises:
   a display control unit to move the position of the pointer on the display screen using the calculated pointer movement amount.

3. The dual pointing device of claim 1, wherein if the determined movement mode type is a long-distance movement mode, the pointer-moving unit moves the pointer using the first signal of the first sensor, and if the determined movement mode type is a short-distance movement mode, the pointer-moving unit moves the pointer using the second signal of the second sensor.

4. The dual pointing device of claim 1, wherein the first sensor includes an angular velocity sensor or an acceleration sensor.

5. The dual pointing device of claim 1, wherein the second sensor includes a pressure-sensitive touch sensor or a capacitive touch sensor.

6. The dual pointing device of claim 1, wherein if there is an input from the second sensor, the movement-mode-determining unit determines the movement mode type as a long-distance movement mode, and, if there is no input from the second sensor, the movement-mode-determining unit determines the movement mode as a short-distance movement mode.

7. The dual pointing device of claim 1, further comprising a click-determining unit to identify a click signal from the second signal of the second sensor, wherein the click signal is created if a user's contact is moved within a predetermined area or within a predetermined amount of time.

8. A dual pointing device based on three-dimensional (3-D) motion and touch sensors, comprising:
   a sensor unit including a first sensor to sense a motion in a space and a second sensor to sense a touch input;
   a movement-mode-determining unit to determine a movement mode type using signals of the first and second sensors;
   a movement-amount-calculating unit to calculate a pointer movement amount using one or more signals of the first and second sensors; and
   a pointer-moving unit to move a pointer on a display screen using at least one of the signals of the first sensor and the second sensor according to the determined movement mode type,
   wherein if the movement mode type is a short-distance movement mode, the movement-amount-calculating unit assigns a lower weight to the pointer movement amount on the display screen appearing by the first signal of the first sensor than to the pointer movement amount on the display screen appearing by the second signal of the second sensor.

9. The dual pointing device of claim 8, wherein the pointer-moving unit comprises a display control unit to move the position of the pointer on the display screen using the calculated pointer movement amount.

10. The dual pointing device of claim 8, wherein if the determined movement mode type is a long-distance movement mode, the pointer-moving unit moves the pointer using the first signal of the first sensor, and if the determined movement mode type is a short-distance movement mode, the pointer-moving unit moves the pointer using the second signal of the second sensor.

11. The dual pointing device of claim 8, wherein the first sensor includes an angular velocity sensor or an acceleration sensor.

12. The dual pointing device of claim 8, wherein the second sensor includes a pressure-sensitive touch sensor or a capacitive touch sensor.

13. The dual pointing device of claim 8, wherein if there is an input from the second sensor, the movement-mode-determining unit determines the movement mode type as a long-distance movement mode, and, if there is no input from the second sensor, the movement-mode-determining unit determines the movement mode as a short-distance movement mode.

14. The dual pointing device of claim 8, further comprising a click-determining unit to identify a click signal from the second signal of the second sensor, wherein the click signal is created if a user's contact is moved within a predetermined area or within a predetermined amount of time.

15. A dual pointing method based on three-dimensional (3-D) motion and touch sensors, comprising:
 detecting a first signal of a first sensor sensing a motion in a space and a second signal of a second sensor sensing a touch input;
 determining a movement mode type using the first signal and the second signal;
 calculating a pointer movement amount using at least one of the first and second signals; and
 moving a pointer on a display screen using at least one of the first and second signals of the first and second sensors according to the determined movement mode type,
 wherein, if the movement mode is a long-distance movement mode, the calculating a pointer movement amount comprises assigning a higher weight to the pointer movement amount on the display screen appearing by the first signal of the first sensor than to the pointer movement amount on the display screen appearing by the second signal of the second sensor.

16. The dual pointing method of claim 15, wherein the moving of the pointer comprises:
 moving the position of the pointer on the display screen according to the calculated pointer movement amount.

17. The dual pointing method of claim 15, wherein the moving of the pointer comprises, if the determined movement mode type is a long-distance movement mode, moving the pointer using the first signal of the first sensor, and, if the determined movement mode type is a short-distance movement mode, moving the pointer using the second signal of the second sensor.

18. A dual pointing method based on three-dimensional (3-D) motion and touch sensors, comprising:
 detecting a first signal and a second signal from a first sensor and second sensor, respectively, the first sensor sensing a motion and the second sensor sensing a touch input;
 determining a movement mode type using the first signal and the second signal; and
 calculating a pointer movement amount on a display screen by combining the first signal and the second signal,
 wherein, if the movement mode is a long-distance movement mode, the calculating a pointer movement amount comprises assigning a higher weight to the pointer movement amount on the display screen appearing by the first signal of the first sensor than to the pointer movement amount on the display screen appearing by the second signal of the second sensor.

19. The dual pointing method of claim 18, wherein the calculating of the pointer movement amount further comprises:
 calculating a first pointer movement amount using the first signal and a second pointer movement amount using the second signal and calculating a final pointer movement amount by multiplying each of the first pointer movement amount and the second pointer movement amount by a weight and summing the multiplication results.

20. A dual pointing method of a dual pointing device including a first sensor to point in a three-dimensional (3-D) space and a second sensor to point by a touch input, comprising:
 determining whether there is an input signal of the second sensor;
 determining a movement mode type using an input signal of the first sensor and the input signal of the second sensor;
 calculating a pointing movement amount on a display screen using a second signal detected by the second sensor if there is an input signal of the second signal; and
 moving a pointer on the display screen using the calculated pointer movement amount,
 wherein, if the movement mode is a long-distance movement mode, the calculating a pointing movement amount comprises assigning a higher weight to the pointing movement amount on the display screen appearing by the input signal of the first sensor than to the pointing movement amount on the display screen appearing by the second signal of the second sensor.

21. The dual pointing method of claim 20, further comprising:
 calculating the pointing movement amount using the input signal detected by the first sensor if there is no input signal of the second sensor.

22. A dual pointing method of a dual pointing device including a first sensor for three-dimensional (3-D) motion-based pointing and a second sensor for touch-input-based pointing, the dual pointing method comprising:
 calculating a first pointer movement amount on a display screen by sensing a first signal using the first sensor;
 determining whether there is an input signal from the second sensor;
 determining a movement mode type using the first signal from the first sensor and the input signal from the second sensor;
 if there is an input signal from the second sensor, calculating a second pointer movement amount on the display screen by sensing a second signal using the second sensor; and
 moving a pointer on the display screen by combining the first and second pointer movement amounts,
 wherein, if the movement mode is a long-distance movement mode, the calculating a first pointer movement amount comprises assigning a higher weight to the first pointer movement amount on the display screen appearing by the first signal from the first sensor than to the second pointer movement amount on the display screen appearing by the input signal from the second sensor.

23. The dual pointing method of claim 22, wherein the moving of the pointer comprises:
 calculating a final pointer movement amount by multiplying each of the first and second pointer movement amounts by each weight assigned to the first and second pointer movement amounts and summing the multiplication results.

24. A dual pointing method based on three-dimensional (3-D) motion and touch sensors, comprising:
 detecting a first signal of a first sensor sensing a motion in a space and a second signal of a second sensor sensing a touch input;
 determining a movement mode type using the first signal and the second signal;
 calculating a pointer movement amount using at least one of the first and second signals; and
 moving a pointer on a display screen using at least one of the first and second signals of the first and second sensors according to the determined movement mode type,
 wherein if the movement mode is a short-distance movement mode, the calculating a pointer movement amount comprises assigning a lower weight to the pointer movement amount on the display screen appearing by the first signal of the first sensor than to the pointer movement amount on the display screen appearing by the second signal of the second sensor.

25. The dual pointing method of claim 24, wherein the moving of the pointer comprises moving the position of the pointer on the display screen according to the calculated pointer movement amount.

26. The dual pointing method of claim 24, wherein the moving of the pointer comprises, if the determined movement mode type is a long-distance movement mode, moving the pointer using the first signal of the first sensor, and, if the determined movement mode type is a short-distance movement mode, moving the pointer using the second signal of the second sensor.

27. A dual pointing method based on three-dimensional (3-D) motion and touch sensors, comprising:
  detecting a first signal and a second signal from a first sensor and second sensor, respectively, the first sensor sensing a motion and the second sensor sensing a touch input;
  determining a movement mode type using the first signal and the second signal; and
  calculating a pointer movement amount on a display screen by combining the first signal and the second signal,
  wherein if the movement mode is a short-distance movement mode, the calculating a pointer movement amount comprises assigning a lower weight to the pointer movement amount on the display screen appearing by the first signal of the first sensor than to the pointer movement amount on the display screen appearing by the second signal of the second sensor.

28. The dual pointing method of claim 27, wherein the calculating of the pointer movement amount further comprises:
  calculating a first pointer movement amount using the first signal and a second pointer movement amount using the second signal and calculating a final pointer movement amount by multiplying each of the first pointer movement amount and the second pointer movement amount by a weight and summing the multiplication results.

29. A dual pointing method of a dual pointing device including a first sensor to point in a three-dimensional (3-D) space and a second sensor to point by a touch input, comprising:
  determining whether there is an input signal of the second sensor;
  determining a movement mode type using an input signal of the first sensor and the input signal of the second sensor;
  calculating a pointing movement amount on a display screen using a second signal detected by the second sensor if there is an input signal of the second signal; and
  moving a pointer on the display screen using the calculated pointer movement amount,
  wherein if the movement mode is a short-distance movement mode, the calculating a pointing movement amount comprises assigning a lower weight to the pointing movement amount on the display screen appearing by the input signal of the first sensor than to the pointing movement amount on the display screen appearing by the second signal of the second sensor.

30. The dual pointing method of claim 29, further comprising:
  calculating the pointing movement amount using the input signal detected by the first sensor if there is no input signal of the second sensor.

31. A dual pointing method of a dual pointing device including a first sensor for three-dimensional (3-D) motion-based pointing and a second sensor for touch-input-based pointing, the dual pointing method comprising:
  calculating a first pointer movement amount on a display screen by sensing a first signal using the first sensor;
  determining whether there is an input signal from the second sensor;
  determining a movement mode type using the first signal from the first sensor and the input signal from the second sensor;
  if there is an input signal from the second sensor, calculating a second pointer movement amount on the display screen by sensing a second signal using the second sensor; and
  moving a pointer on the display screen by combining the first and second pointer movement amounts,
  wherein if the movement mode is a short-distance movement mode, the calculating a first pointer movement amount comprises assigning a lower weight to the first pointer movement amount on the display screen appearing by the first signal from the first sensor than to the second pointer movement amount on the display screen appearing by the input signal from the second sensor.

32. The dual pointing method of claim 31, wherein the moving of the pointer comprises:
  calculating a final pointer movement amount by multiplying each of the first and second pointer movement amounts by each weight assigned to the first and second pointer movement amounts and summing the multiplication results.

* * * * *